(12) United States Patent
Hallas (10) Patent No.: US 8,855,218 B2
(45) Date of Patent: Oct. 7, 2014

(54) METHOD AND APPARATUS FOR DATA COMMUNICATIONS OVER POWER LINES

(71) Applicant: Mega Act Technologies Holding Ltd, Tortola (VG)

(72) Inventor: Hassan Ibrahim Hallas, McLean, VA (US)

(73) Assignee: Mega Act Technologies Holdings Ltd, Tortola (VG)

( * ) Notice: Subject to any disclaimer, the term of this patent is extended or adjusted under 35 U.S.C. 154(b) by 0 days.

(21) Appl. No.: 13/718,765

(22) Filed: Dec. 18, 2012

(65) Prior Publication Data
US 2014/0146899 A1      May 29, 2014

Related U.S. Application Data (63) Continuation-in-part of application No. 13/684,326, filed on Nov. 23, 2012, now abandoned.

(51) Int. Cl.
*H04B 3/00* (2006.01)
*H04B 3/54* (2006.01)

(52) U.S. Cl.
CPC ........................ *H04B 3/542* (2013.01)
USPC .......................................................... 375/257

(58) Field of Classification Search
CPC ........................................................ H04B 3/542
USPC .......................................................... 375/257
See application file for complete search history.

(56) References Cited

U.S. PATENT DOCUMENTS

| | | | |
|---|---|---|---|
| 6,154,488 A * | 11/2000 | Hunt | 375/219 |
| 2003/0224784 A1* | 12/2003 | Hunt et al. | 455/426.2 |
| 2004/0214522 A1* | 10/2004 | Santhoff et al. | 455/12.1 |
| 2004/0218688 A1 | 11/2004 | Santhoff et al. | |
| 2004/0227036 A1* | 11/2004 | Arita et al. | 246/209 |
| 2005/0020232 A1* | 1/2005 | Bonicatto et al. | 455/402 |
| 2005/0091413 A1* | 4/2005 | Walbeck et al. | 709/251 |
| 2005/0111533 A1* | 5/2005 | Berkman et al. | 375/220 |
| 2006/0203897 A1* | 9/2006 | Kodama et al. | 375/219 |
| 2011/0140911 A1 | 6/2011 | Pant et al. | |
| 2011/0310943 A1* | 12/2011 | Dawson et al. | 375/222 |
| 2013/0051446 A1* | 2/2013 | Vijayasankar et al. | 375/224 |

OTHER PUBLICATIONS

International Search Report and Written Opinion Issued on Feb. 20, 2013 in PCT/US 12/66445.

* cited by examiner

*Primary Examiner* — Juan A Torres
(74) *Attorney, Agent, or Firm* — McCarter & English, LLP; David R. Burns (57) ABSTRACT

A computer-implemented method of transferring data from a source to a destination on an alternating current (AC) power waveform propagating over a utility power distribution network, where the computer includes a processor operatively coupled to the utility power distribution network via a power supply, includes sending a request over the power distribution network to create a virtual communication channel between the source and the destination on the power distribution network. The method further includes generating, by the processor, a data packet to be transmitted from the source to the destination via the virtual communication channel, and modulating the power drawn from the power supply to encode a series of static pulses onto the AC at predetermined intervals according to a function of frequency that is unique to the virtual communication channel.

24 Claims, 5 Drawing Sheets

METHOD AND APPARATUS FOR DATA COMMUNICATIONS OVER POWER LINES

RELATED APPLICATIONS

This application is a continuation-in-part of U.S. patent application Ser. No. 13/684,326, entitled "METHOD AND APPARATUS FOR DATA COMMUNICATIONS OVER POWER LINES" and filed Nov. 23, 2012, which is hereby incorporated by reference in its entirety.

BACKGROUND

1. Field of the Invention

Embodiments of the invention relate generally to data communications over power lines, and more particularly, to methods and apparatus for transferring data over a utility power distribution system, also referred to herein as a power grid.

2. Description of Related Art

Conventional carrier frequency systems are commonly used for data communications over high-tension utility power lines. It is desirable to utilize the existing power distribution infrastructure because it is widely interconnected with virtually every home and building, at least within the geographic reach of any given power grid. Conventional power line communications systems operate by impressing a modulated carrier signal on the wiring system. Different types of powerline communications use different frequency bands, depending on the signal transmission characteristics of the power wiring used. However, because the power distribution systems in most countries were originally intended for transmission of alternating current (AC) power at frequencies of 50 to 60 Hz, the existing infrastructure of power wire circuits has only a limited ability to carry higher frequencies. This is particularly the case within the "last mile" or final leg of the distribution system, which can present a bandwidth bottleneck. Furthermore, data communication rates can be inversely proportional to the distance between communicating devices. Thus, the signal propagation problem is a limiting factor for conventional power line communications.

Broadband over power lines (BPL) is another conventional method of power line communication that allows relatively high-speed digital data transmission over the existing power distribution infrastructure. BPL uses parts of the radio spectrum allocated to other over-the-air communication services. However, radio interference and substandard wiring are a limiting factors in the performance of BPL systems.

SUMMARY

According to one embodiment, a computer-implemented method of transferring data from a source to a destination on an alternating current (AC) power waveform propagating over a utility power distribution network, where the computer includes a processor operatively coupled to the utility power distribution network via a power supply, includes sending a request over the power distribution network to create a virtual communication channel between the source and the destination on the power distribution network. The method further includes generating, by the processor, a data packet to be transmitted from the source to the destination via the virtual communication channel, and modulating the power drawn from the power supply to encode a series of static pulses onto the AC power at predetermined intervals according to a function of frequency that is unique to the virtual communication channel.

In some embodiments, each static pulse may have a magnitude of approximately 0.00125 volts. In some embodiments, the function may be:

$$f(x) = \frac{x + \cos(x)}{2^x}$$

In some embodiments, the data packet may include an address of the destination. The address may include an identification number associated with the power supply of the destination, an identification number associated with a basic input-output system (BIOS) of the destination, a clock time of a first ping sent from the source to the destination, a clock time value from a real-time clock of the destination, a speed of the processor of the destination, a random function and/or an input-output error time. In some embodiments, each of the static pulses may represent a change of a logical state corresponding to an individual data bit in the data packet.

In some embodiments, the method may further include generating, by the processor, a unique address associated with the source, modulating the power supply to encode a series of static pulses onto the AC power waveform for transferring a sequence of pings over the utility power distribution system, receiving an acknowledgement signal from the destination including an address of the destination, and creating the virtual communication channel based on the address of the destination. The series of static pulses may correspond to an encoding of the sequence of pings with the unique address.

According to one embodiment, a computer-implemented method of transferring data from a source to a destination on an alternating current (AC) power waveform propagating over a utility power distribution system, where the computer includes a processor operatively coupled to the utility power distribution system via a power supply, includes receiving a request for data communications via a virtual communication channel by the processor via an interface coupled between the processor and the power supply, acknowledging the request, receiving data encoded at predetermined intervals according to a function of frequency unique to the virtual communication channel, and decoding, by the processor, the data packet based on the function.

In some embodiments, each static pulse may have a magnitude of approximately 0.00125 volts. In some embodiments, the function may be the inverse of:

$$f(x) = \frac{x + \cos(x)}{2^x}$$

In some embodiments, the data packet may include an address of the destination. The address may include an identification number associated with the power supply of the source, an identification number associated with a basic input-output system (BIOS) of a source computer, a clock time of a first ping sent from the source to the destination, a clock time value from a real-time clock of the source, a speed of a processor of the source, a random function and/or an input-output error time. In some embodiments, each of the static pulses may represent a change of a logical state corresponding to an individual data bit in the data packet.

In some embodiments, the method may further include receiving, by the processor via the interface coupled between the processor and the power supply, a series of static pulses corresponding to an encoding of a sequence of pings, a series of static pulses on the AC power waveform, and creating the virtual communication channel based on the unique address. The series of static pulses may correspond to an encoding of the sequence of pings and a unique address.

According to one embodiment, a non-transitory computer-readable medium has stored thereon computer-executable instructions that when executed by a computer cause the computer to send a request over the power distribution network to create a virtual communication channel between the source and the destination on the power distribution network, generate a data packet to be transmitted from the source to the destination via the virtual communication channel, and modulate the power drawn from the power supply to encode a series of static pulses onto the AC power at predetermined intervals according to a function of frequency that is unique to the virtual communication channel.

In some embodiments, each static pulse may have a magnitude of approximately 0.00125 volts. In some embodiments, the function may be:

$$f(x) = \frac{x + \cos(x)}{2^x}$$

In some embodiments, the data packet may include an address of the destination. The address may include an identification number associated with the power supply of the destination, an identification number associated with a basic input-output system (BIOS) of the destination, a clock time of a first ping sent from the source to the destination, a clock time value from a real-time clock of the destination, a speed of the processor of the destination, a random function and/or an input-output error time. In some embodiments, each of the static pulses may represent a change of a logical state corresponding to an individual data bit in the data packet.

In some embodiments, the computer readable medium may further include computer-executable instructions that when executed by the computer cause the computer to generate a unique address associated with the source, modulate the power supply to encode a series of static pulses onto the AC power waveform for transferring a sequence of pings over the utility power distribution system, the series of static pulses corresponding to an encoding of the sequence of pings with the unique address, receive an acknowledgement signal from the destination including an address of the destination, and create the virtual communication connection based on the address of the destination.

According to one embodiment, a non-transitory computer-readable medium has stored thereon computer-executable instructions that when executed by a computer cause the computer to receive a request for data communications via a virtual communication channel and via an interface coupled between a processor of the computer and a power supply of the computer, acknowledge the request, receive data encoded at predetermined intervals according to a function of frequency unique to the virtual communication channel, and decode the data packet based on the function.

In some embodiments, each static pulse may have a magnitude of approximately 0.00125 volts. In some embodiments, the function may be the inverse of:

$$f(x) = \frac{x + \cos(x)}{2^x}$$

In some embodiments, the data packet may include an address of the destination. The address may include an identification number associated with the power supply of the source, an identification number associated with a basic input-output system (BIOS) of a source, a clock time of a first ping sent from the source to the destination, a clock time value from a real-time clock of the source, a speed of a processor of the source, a random function and/or an input-output error time. In some embodiments, each of the static pulses may represent a change of a logical state corresponding to an individual data bit in the data packet.

In some embodiments, the computer readable medium may further include computer-executable instructions that when executed by the computer cause the computer to receive, by the processor via the interface coupled between the processor and the power supply, a series of static pulses corresponding to an encoding of a sequence of pings, a series of static pulses on the AC power waveform, the series of static pulses corresponding to an encoding of the sequence of pings and a unique address, and establish the virtual communication channel based on the unique address.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various embodiments include methods and apparatus for transferring data over power lines, such as found in a utility power distribution system, also referred to as the power grid or electrical grid. The power grid can include power generating stations, transmission lines for carrying the power from the generating stations to power consumers, and/or transformers for reducing the voltage for final delivery. The topology of the power grid can have varying characteristics; however, in general, the power grid is an electrical network interconnecting many end points (e.g., power-consuming devices). In some embodiments, data can be transferred over the power grid between devices connected to the grid at any end point, regardless of the distance between the devices or the path through the power grid connecting the devices together.

As used herein, the term "power line" means any circuit capable of transferring energy via alternating current, includes conventional electric transmission lines and electric distribution networks, such as those used by utility power companies, and is not intended to limit the meaning of the term to a single power line, as the circuit may comprise one or more physical power lines.

According to an embodiment, one example of a method of communicating data over power lines includes modulating a power output of a power supply of a source device, such as a computer, according to a specific frequency-based function that represents the data and is associated with a virtual communication channel between the source device and a destination device (e.g., another computer). The power output of the power supply is modulated (e.g., by a CPU or other processor coupled to the power supply) in such a way that causes the power supply to momentarily draw an increased amount of power from the power grid to which it is connected at intervals determined by the frequency function. The momentary increase in power drawn impresses a static pulse upon the power waveform, which propagates throughout the power grid without imposing any load, eventually reaching the destination device, which is also connected to the grid. A sequence of static pulses represents the data being sent from the source device to the destination device, and can be received and interpreted by the destination device as the inverse of the function of frequency used by the source device when sending the data.

The timing of the modulation is regulated by a function of frequency that is unique to a virtual connection between the source device and the destination device, as established when the virtual connection is first established prior to sending data, and the logical state of the data being sent. Accordingly, the data being transferred from the source device to the destination device is represented at least in part by a pattern of static pulses impressed on the power waveform at predetermined intervals, as defined by the unique frequency function. The logical state of each bit in the data, or changes in the logical state between successive bits, can be represented by the presence and/or absence of a static pulse at each predetermined interval. In some embodiments, data can be transferred over the power lines at up to $10^{13}$ bits per second per virtual connection.

Figure 1:
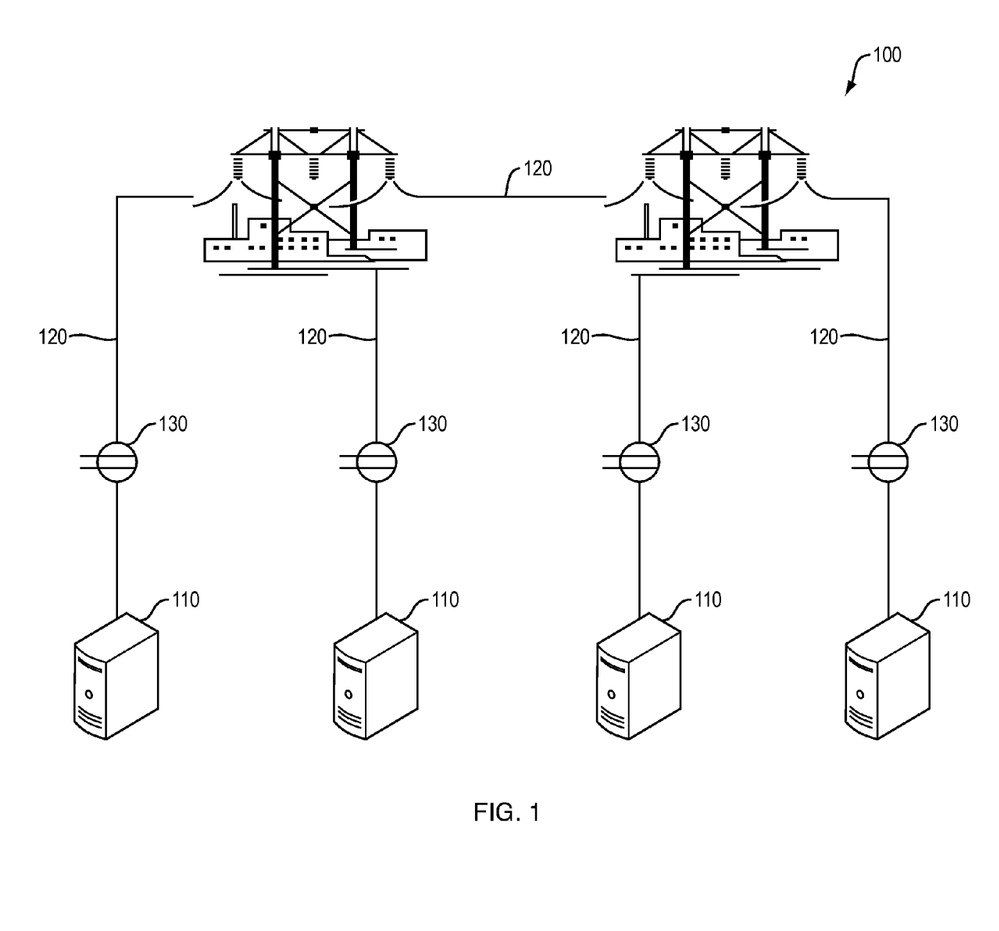
FIG. 1 depicts a simplified block diagram of one example of an electrical power grid with multiple computing devices electrically connected to one or more power lines in accordance with one embodiment.

FIG. 1 depicts a block diagram of one example of an electrical power grid 100 with multiple computing devices 110 electrically connected to one or more power lines 120, which may form at least part of the power grid 100. Since each device 110 is connected to the same power grid 100, each device 110 is in electrical communication with all other devices 110 that also connected to the grid 100 via the power lines 120. Each device 110 may be connected to the grid, for example, via a conventional utility power outlet 130. As will be understood by one of ordinary skill in the art, the power grid 100 can include one or more power generating stations, substations and/or transformers in addition to the power lines 120 and through which power may flow.

Figure 2:
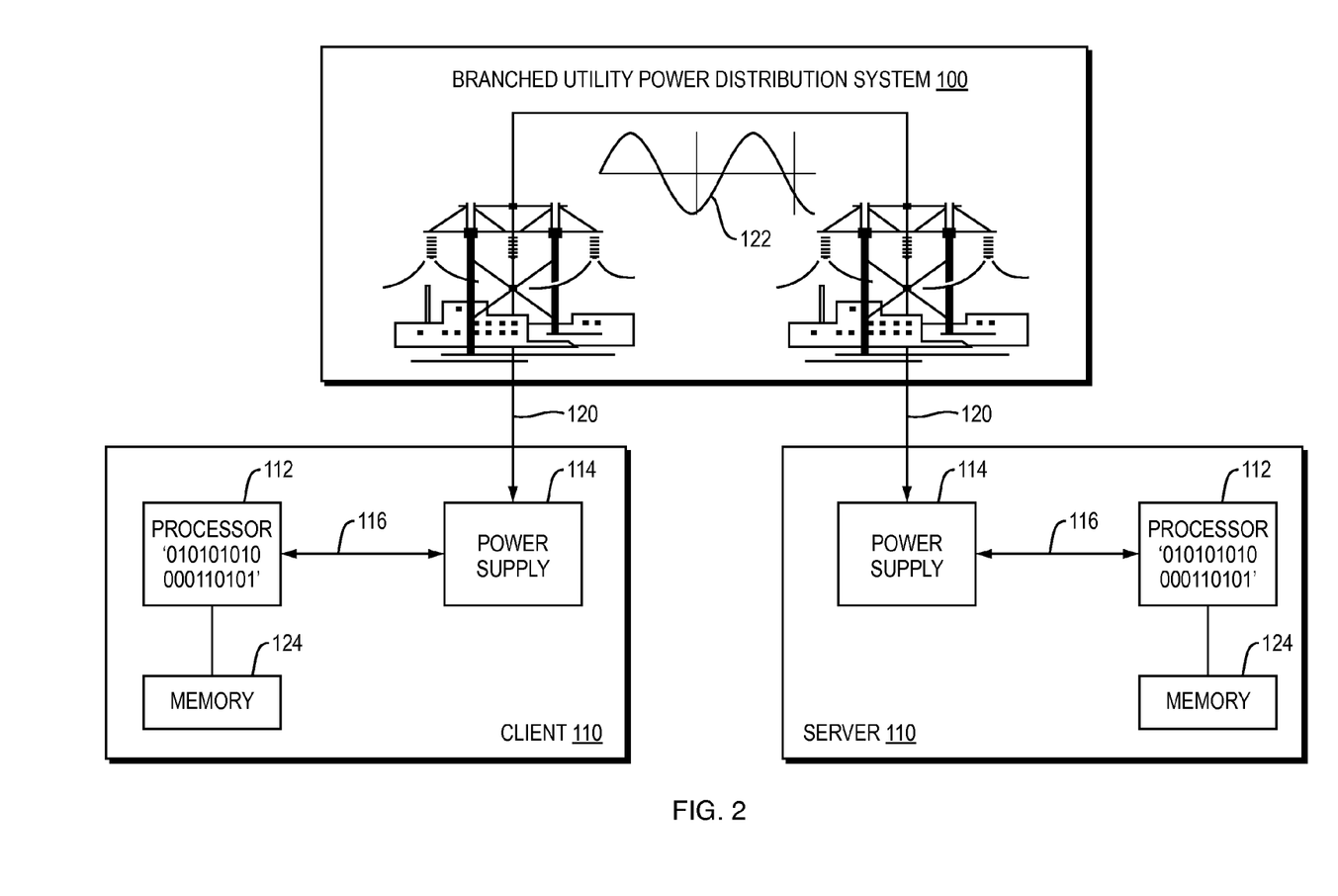
FIG. 2 depicts a simplified block diagram of one example of two of the devices of FIG. 1 in accordance with one embodiment.

FIG. 2 depicts a simplified block diagram of one example of two of the devices 110 of FIG. 1, according to one embodiment. Each device 110 may include a server or other computing device (e.g., a tablet computer, laptop, cellular telephone, personal digital assistant, etc.) connected to the power grid having a central processing unit (CPU), or other type of processor 112, a power supply 114 configured to be coupled to the power grid 100 via the power lines 120, and an interface 116 coupled to and between the processor and the power supply. The processor 112 is configured to execute instructions, such as encoded in a software or firmware program. In one embodiment, the instructions are configured to cause the processor 112 to perform a process of sending and/or receiving data over the power lines 120, as described herein, for example, with respect to FIG. 3. According to some embodiments, data can be transferred over the power grid between computing devices, using software and/or firmware instructions executed by a processor adapted for use with embodiments of the invention, without modifications to the hardware of the computing devices, as long as each computing device is electrically connected to the power grid, such as through a conventional power cord. In one embodiment, one of the devices 110 is referred to as a server and one a client; however, each device 110 can be configured to send and/or receive data over the power lines 120. The client may, for example, act as a master device for establishing and controlling a virtual connection with the server, but in other respects functions in substantially the same manner as the server with respect to sending and/or receiving data.

In one embodiment, data resides or is generated in digital form on one of the devices 110 called the source device. The server or the client may act as the source device, depending on the direction of the data transfer. The data can be transferred to another one of the devices 110 over the power lines 120 by converting the data from digital form into a function of frequency. The frequency function can be used, via the interface 116, to modulate a power output of the power supply 114, such that each bit (or binary value) of the data is represented as a static pulse impressed upon a power waveform 122 (e.g., 50 or 60 Hz AC power) that is communicated over the power lines 120 and the power grid 100 to another device 110 called the destination device. The processor 112 of the destination device, in turn, detects the presence or absence of any static pulses on the power waveform 122, via the corresponding power supply 114 and interface 116, at specific intervals on the power waveform 122 corresponding to the frequency function. Such detection is accomplished by applying the inverse of the frequency function used by the source device to the incoming power waveform 122. In this embodiment, the static pulse imposes no load upon the power grid 100, does not alter the phase or magnitude of the power waveform 122 and, unlike some conventional techniques, does not impress a carrier signal on the power line or utilize different portions of the radio spectrum. In one embodiment, the static pulse has a magnitude of approximately 0.00125 volts.

As described above, the logical state of each bit in the data, or changes in the logical state between successive bits, can be represented in frequency form by the presence or absence of a static pulse at predetermined intervals on the power waveform 122. For example, the presence of a static pulse at an interval corresponding to the frequency function may indicate a change in state of the data from logical zero to logical one or vice versa, and the absence of a static pulse at the interval may indicate no change in state in the data (i.e., if the last bit was a logical zero, the next bit is a logical zero, and if the last bit was a logical one, the next bit is a logical one). In another example, the presence of a static pulse at the interval may indicate that the current bit is a logical one (or logical zero), and the absence of a static pulse at the interval may indicate that the current bit is a logical zero (or logical one). The destination device detects the data as an inverse of the same frequency function used by the source device, and converts the data back into digital form.

In one embodiment, each device 110 includes a memory 124 containing instructions that when executed by the processor 112 cause the processor to perform at least two processes: a synchronization process and a send/receive data process. The synchronization process starts by activating an executable code file. The executable code uniquely identifies the main or AC power socket (e.g., outlet 130 in FIG. 1) that the device 110 is connected to. The synchronization process looks for another device 110 is connected on the electrical grid and has a code identity or code identifier to identify. The send/receive data process causes data to be sent from the source device to the destination device over the power line 120. The destination device allows a certain amount of time for receiving the designated file, and will send an acknowledgment to the source device once it has received the file. The source device fragments the data into multiple packets and sends all of the packets until all of the packets are sent to the destination device. The destination device assembles the packets in sequential order and defragments the data.

Figure 3:
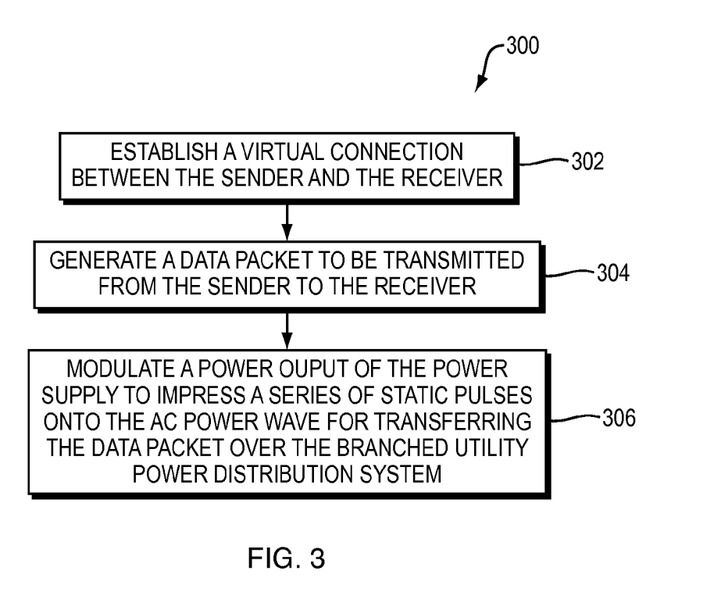
FIG. 3 is a flow chart depicting one example of a method of sending data over a power line in accordance with one embodiment.

FIG. 3 is a flow chart depicting one example of a method 300 of sending data over a power line, according to one embodiment. It will be understood that method 300 is described from the perspective of a source device, that is, a device that is sending data to a destination device. The source device can be a server or a client, as both the server and the client may send data to the other using method 300. While sending data, the respective device is referred to as a source device; while receiving data, the respective device is referred to as a destination device. Thus, any device may act as either a source device, a destination device, or both, depending on the direction of the data flow.

Before data can be sent from a source device to a destination device over a power line, a virtual connection must be established between the source device and the destination device (step 302). The virtual connection may include one or more of the following: a unique address of the source device (i.e., the address is different than the address of any other device with which the device may communicate), a unique address of the destination device, and a route or data path along which data may be transferred from the source device to the destination device. The route may physically include other devices that function as repeaters or relays for transferring the data from one point to another point along the path. After the virtual connection is established, data can be transferred over a power line from the source device to a destination device using the virtual connection as a basis for modulating and/or demodulating the power supply.

In another embodiment, the destination device establishes the virtual connection with the source device using the unique address of the source device and the port address of the source device. The source device waits for the destination device to open the virtual connection before sending any data to the destination device. The destination device controls when to close the virtual connection. In one embodiment, two or more virtual connections can be established between the source device and the destination device.

At step 304, a data packet to be transmitted or transferred over the power line from the source device to the destination device is generated by the source device. The data packet includes at least a portion of the data that is to be transmitted, and may include additional information such as a destination address of the destination device, routing information, timing information and/or error detection information. The format and content of each data packet is associated with a data transfer protocol that is known and used by both the source device and the destination device; one example of such a protocol is described below. Multiple data packets may be generated as necessary to send all of the data, if the amount of data is more than can be included in a single data packet. The destination device collects all of the data packets as they are received and reassembles the data from the collected packets.

At step 306, the source device modulates, by a processor of the source device via an interface coupled between the processor and a power supply of the source device, a power output of the power supply to impress a series of static pulses onto the power line. The power line carries an AC power waveform with the series of static pulses for transferring the data packet over the utility power distribution system. The series of static pulses correspond to an encoding of the data packet at predetermined intervals on the AC power according to a function of frequency that is unique to the virtual connection. In other words, no other virtual connection between the source device and another device uses the same frequency function for encoding the data packet. While the source device uses the unique frequency function to send data to the destination device, the destination device uses an inverse of the same frequency function to receive the data sent by the source device. In this manner, the source device and the destination device are able to exchange data that is encoded according to a frequency function that is known and used by the two devices and may not be known or used by any other devices, in effect creating a virtual communication channel between the source device and the destination device. In another embodiment, one or more devices (e.g., the source device and/or the destination device) may exchange data over multiple virtual connections, e.g., by using different communication port numbers each associated with different virtual connections. In this embodiment, each communication port can be associated with a different unique frequency function for transferring data.

In one embodiment, the frequency function is $$f(x) = \frac{x + \cos(x)}{2^x},$$

where x is frequency.

In one embodiment, the method 300 can be implemented as a function or routine in the operating system or other application executing on the source and destination. The function or routine may be executed, for example, repeatedly at a predetermined frequency using clocks, interrupts or other timing mechanisms.

Figure 4:
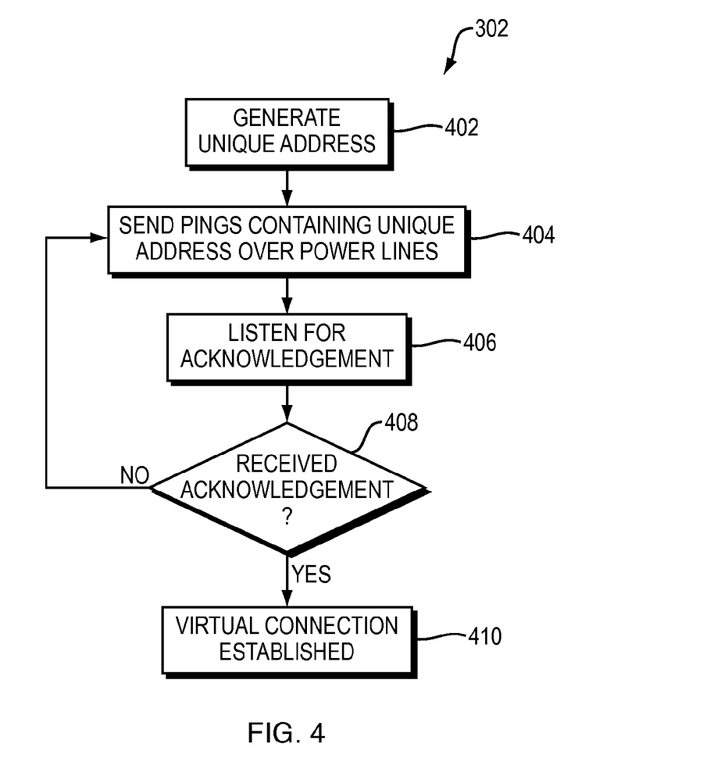
FIG. 4 is a flow chart depicting one example of a step of establishing a virtual connection over the power line between a source and a destination in accordance with one embodiment.

FIG. 4 is a flow chart depicting one example of the step of establishing a virtual connection over the power line between the source and the destination, such as in step 302 of FIG. 3, according to one embodiment. At step 402, the source device generates a unique address that can be used to represent the identity of the destination device when sending data over the power line. For example, the unique address may be used to identify the destination device to any other device that receives data sent by the destination device and/or may be used by any other device to send data to the destination device.

At step 404, the source device sends ping messages (e.g., unsolicited data) containing the source device's unique address over the power lines. The pings are intended to be broadcast throughout the power grid and received by the destination device to which it is addressed. In one embodiment, the source device can send any number of pings (e.g., tens, hundreds, thousands or more) for any length of time. When the destination device receives a ping from the source device, it sends an acknowledgement message back to the source device over the power line. Thus, at step 406, the source device listens for the acknowledgement message. At step 408, if no acknowledgement is received, the source device may return to step 404 and continue to send pings. In one embodiment, while the source device is listening for the acknowledgement message (steps 406 and 408), it may continue to send pings as at step 404. However, if at step 408 the source device receives an acknowledgement message, a virtual connection is established between the source device and the destination device at step 410. Path information associated with the virtual connection may be stored in a database of the server or source device. The path information can be used for routing data from the source device to the destination device over the power grid as long as the virtual connection between the source device and the destination device is established or open.

Figure 5:
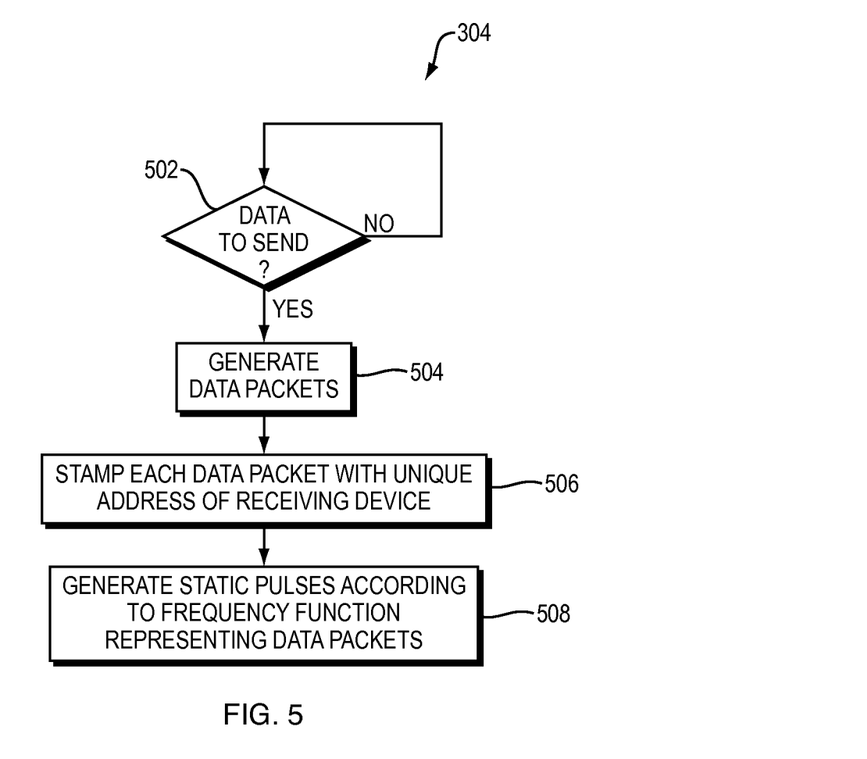
FIG. 5 is a flow chart depicting one example of a step of generating a data packet in accordance with one embodiment.

Once the virtual connection is established, the source device may generate data packets to be transmitted to the destination device using the virtual connection. FIG. 5 is a flow chart depicting one example of the step of generating the data packet, such as in step 304 of FIG. 3, according to one embodiment. At step 502, if there is no data to send to the destination device, the process repeats step 502. Data may be provided, for example, by an application or operating system executing the source device (e.g., a file transfer protocol (FTP) program, a web browser, a mail program, a database server or client, etc.). However, if there is data to send, the source device generates one or more data packets containing the data at step 504. That is, the data may be divided and packetized, and each packet can be sent to the destination device one at a time. In one example, each data packet may include 16 bits of data. In another example, each data packet may include a header or field containing the unique address of the destination device and/or routing information for the data packet, such as indicated in FIG. 5 at step 506. In yet another example, the first data packet may include a size of the entire amount of data to be transferred, the total number of data packets to be transferred, and/or the number of static pulses to be sent. Subsequent data packets may include the payload (i.e. portions of the data).

After the data packet has been generated and stamped with the header or field containing the unique address of the destination device and/or routing information for the data packet, at step 508, the source device generates a series of static pulses according to a frequency function, such as by modulating the power output of the power supply (e.g., step 306 of FIG. 3). In some embodiments, the frequency function is unique to the virtual connection, and is used to generate the static pulses that represent the data being transferred from the source device to the destination device.

In one embodiment, the data packet includes, in addition to at least a portion of the data to be transferred, an address of the destination, the address including at least one of an identification number associated with the power supply of the destination, an identification number associated with a basic input-output system (BIOS) of the computer, a clock time of a first ping sent from the source to the destination, a clock time value from a real-time clock of the destination, a speed of the processor of the destination, a random function and/or an input-output error time. One or more of the above elements may be used to uniquely identify the source to the destination, and/or for routing and/or error detection purposes.

Figure 6:
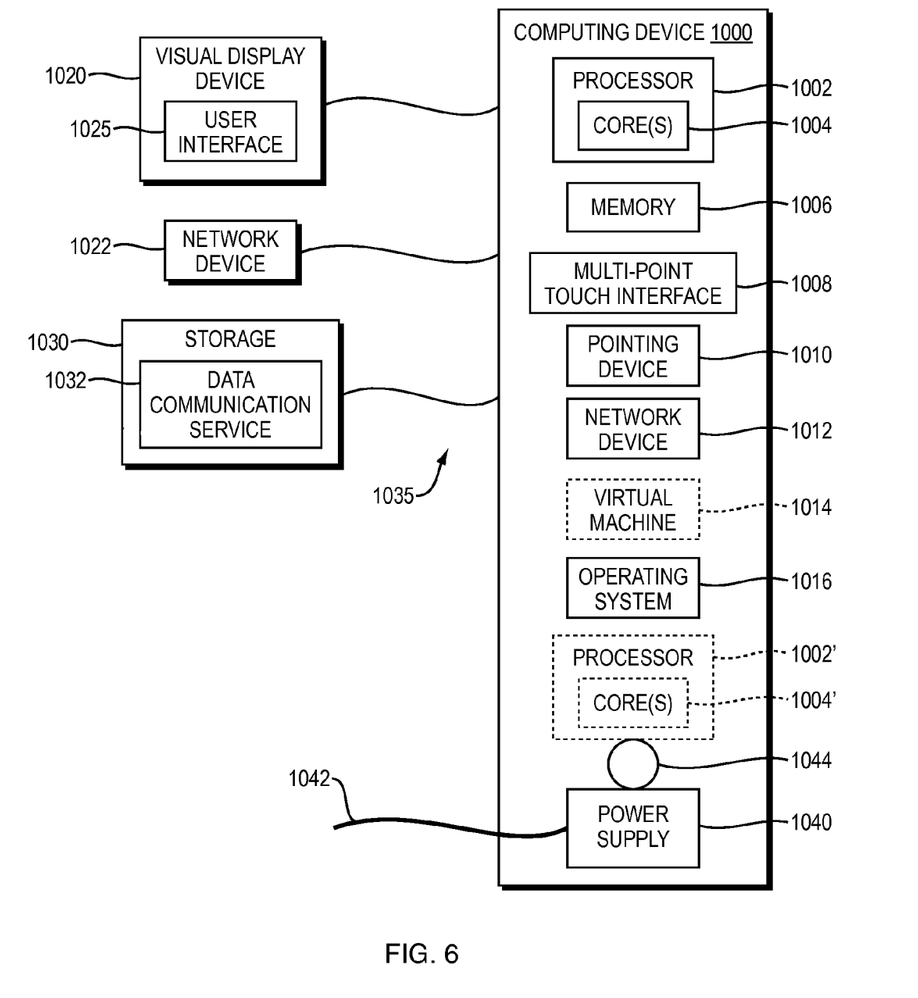
FIG. 6 is a block diagram of an exemplary computing device that may be used to perform any of the methods in the exemplary embodiments.

FIG. 6 is a block diagram of an exemplary computing device 1000 that may be used to perform any of the methods in the exemplary embodiments. The computing device 1000 may be any suitable computing or communication device or system, such as a mobile computing or communication device (e.g., the iPhone® mobile device by Apple), laptop, handheld computer, tablet computer (e.g., the iPad® tablet computer by Apple), or other form of computing or telecommunications device that is capable of communication and that has sufficient processor power and memory capacity to perform the operations described herein.

The computing device 1000 includes one or more non-transitory computer-readable media for storing one or more computer-executable instructions, programs or software for implementing exemplary embodiments. The non-transitory computer-readable media may include, but are not limited to, one or more types of hardware memory, non-transitory tangible media (for example, one or more magnetic storage disks, one or more optical disks, one or more USB flash drives), and the like. For example, memory 1006 included in the computing device 1000 may store computer-readable and computer-executable instructions, programs or software for implementing exemplary embodiments. Memory 1006 may include a computer system memory or random access memory, such as DRAM, SRAM, EDO RAM, and the like. Memory 1006 may include other types of memory as well, or combinations thereof.

The computing device 1000 also includes processor 1002 and associated core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

The computing device 1000 further includes a power supply 1040 electrically connected to a power cord 1042. The power supply 1040 may be electrically connected to the processor 1002 and/or other processor(s) 1002' via an interface 1044. The power cord 1042 is configured to be electrically connected to a power grid, such as utility power.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

A user may interact with the computing device 1000 through a virtual display device 1020 and at least one associated user interface 1025. For example, virtual display device 1020 may include a visual display or a speaker. The associated user interface 1025 may be, for example, a pointing device (e.g., a mouse), multi-point touch interface, a touch-sensitive screen, a camera, or a microphone. As illustrated in FIG. 5, the presentation device 1020 may be linked to the associated user interface 1025. One example of a linked combination is a touch-sensitive screen that includes the user interface 1025 and the visual display presentation device 1020. The presentation device 1020 and the user interface 1025 may also have other uses. For example, a microphone and speaker on a mobile communication device may be used to make phone calls, receive voice input from the user and provide prompts to the user. As another example, the microphone can be used to input audible queries, information, and/or other voice information that can be processed by the computing device 1000 and/or can be processed by a device remote to, but in communication with, the computing device 1000. The presentation device 1020, however, need not be linked to the associated user interface 1025. For example, the computing device 1000 may include other input/output (I/O) devices for receiving input from a user, for example, a keyboard or any suitable multi-point touch interface 1008, a pointing device 1010, a microphone. The keyboard 1008 and the pointing device 1010 may be coupled to the presentation device 1020 and used as the user interface 1025. The computing device 1000 may include other suitable conventional I/O peripherals.

The computing device 1000 may include one or more storage devices 1030, such as a hard-drive, flash memory, or other computer readable media, for storing data and computer-readable instructions and/or software that implement portions of exemplary embodiments of a data communication service 1032. In exemplary embodiments, the data communication service 1032 can implement aspects of sending and receiving data over a power line, such as described above with respect to FIGS. 1-5. The one or more exemplary storage devices 1030 may also store configuration data associated with an embodiment of the data communication service 1032, for example, a routing table and/or list of unique device addresses. The computing device 1000 may be in communication with the one or more storage devices 1030 via a bus 1035. The bus 1035 may include parallel and/or bit serial connections, and may be wired in either a multi-drop (electrical parallel) or daisy-chain topology, or connected by switched hubs, as in the case of USB.

The computing device 1000 may include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

The computing device 1000 may run any operating system 1016, such as any of the versions of the Microsoft® Windows® operating systems by Microsoft Corp. of Redmond, Wash., any version of the Unix and Linux operating systems, any version of the MacOS® operating system by Apple for Macintosh computers, any version of the Android® operating system by Google, Inc. of Mountain View, Calif., any embedded operating system, any real-time operating system, any open source operating system, any proprietary operating system, any operating systems for mobile computing devices, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Having thus described several exemplary embodiments of the invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A computer-implemented method of transferring data from a source to a destination on an alternating current (AC) power waveform propagating over a utility power distribution network, the computer including a processor operatively coupled to the utility power distribution network via a power supply, the method comprising:

sending a request over the power distribution network to create a virtual communication channel between the source and the destination on the power distribution network;

generating, by the processor, a data packet to be transmitted from the source to the destination via the virtual communication channel; and modulating the power drawn from the power supply of the computer to encode a series of static pulses onto the AC power at predetermined intervals according to a function of frequency that is unique to the virtual communication channel.

2. The computer-implemented method of claim 1, wherein each static pulse has a magnitude of approximately 0.00125 volts.

3. The computer-implemented method of claim 1, wherein the function is:

$$f(x) = \frac{x + \cos(x)}{2^x}.$$

4. The computer-implemented method of claim 1, wherein the data packet includes an address of the destination, the address including at least one of an identification number associated with the power supply, an identification number associated with a basic input-output system (BIOS) of the destination, a clock time of a first ping sent from the source to the destination, a clock time value from a real-time clock of the destination, a speed of the processor, a random function and an input-output error time.

5. The computer-implemented method of claim 1, wherein each of the static pulses represents a change of a logical state corresponding to an individual data bit in the data packet.

6. The computer-implemented method of claim 1, further comprising:

generating, by the processor, a unique address associated with the source;

modulating the power supply to encode a series of static pulses onto the AC power waveform for transferring a sequence of pings over the utility power distribution system, the series of static pulses corresponding to an encoding of the sequence of pings with the unique address;

receiving an acknowledgement signal from the destination including an address of the destination; and creating the virtual communication channel based on the address of the destination.

7. A computer-implemented method of transferring data from a source to a destination on an alternating current (AC) power waveform propagating over a utility power distribution system, the computer including a processor operatively coupled to the utility power distribution system via a power supply, the method comprising:

receiving a request for data communications from the source or the destination via a virtual communication channel by the processor via an interface coupled between the processor and the power supply, the virtual communication channel created by modulating the power supply of the computer to encode a series of static pulses onto the AC power waveform to communicate a unique address associated with the source or the destination;

acknowledging the request;

receiving data encoded on the AC power at predetermined intervals according to a function of frequency unique to the virtual communication channel; and decoding, by the processor, the data packet based on the function.

8. The computer-implemented method of claim 7, wherein each static pulse has a magnitude of approximately 0.00125 volts.

9. The computer-implemented method of claim 7, wherein the function is the inverse of:

$$f(x) = \frac{x + \cos(x)}{2^x}.$$

10. The computer-implemented method of claim 7, wherein the data packet includes an address of the destination, the address including at least one of an identification number associated with the power supply of the source, an identification number associated with a basic input-output system (BIOS) of a source, a clock time of a first ping sent from the source to the destination, a clock time value from a real-time clock of the source, a speed of a source processor, a random function and an input-output error time.

11. The computer-implemented method of claim 7, wherein each of the static pulses represents a change of a logical state corresponding to an individual data bit in the data packet.

12. The computer-implemented method of claim 7, further comprising:

receiving, by the processor via the interface coupled between the processor and the power supply, a series of static pulses corresponding to an encoding of a sequence of pings, a series of static pulses on the AC power waveform, the series of static pulses corresponding to an encoding of the sequence of pings and a unique address; and creating the virtual communication channel based on the unique address.

13. A non-transitory computer-readable medium having stored thereon computer-executable instructions that when executed by a computer cause the computer to:

send a request over a power distribution network to create a virtual communication channel between a source and a destination on the power distribution network;

generate a data packet to be transmitted from the source to the destination via the virtual communication channel; and modulate the power drawn from the power supply of the computer to encode a series of static pulses onto the AC power at predetermined intervals according to a function of frequency that is unique to the virtual communication channel.

14. The computer readable medium of claim 13, wherein each static pulse has a magnitude of approximately 0.00125 volts.

15. The computer readable medium of claim 13, wherein the function is:

$$f(x) = \frac{x + \cos(x)}{2^x}.$$

16. The computer readable medium of claim 13, wherein the data packet includes an address of the destination, the address including at least one of an identification number associated with the power supply, an identification number associated with a basic input-output system (BIOS) of the destination, a clock time of a first ping sent from the source to the destination, a clock time value from a real-time clock of the destination, a speed of the processor, a random function and an input-output error time.

17. The computer readable medium of claim 13, wherein each of the static pulses represents a change of a logical state corresponding to an individual data bit in the data packet.

18. The computer readable medium of claim 13, further comprising computer-executable instructions that when executed by the computer cause the computer to:

generate a unique address associated with a source;

modulate the power supply to encode a series of static pulses onto the AC power waveform for transferring a sequence of pings over the utility power distribution system, the series of static pulses corresponding to an encoding of the sequence of pings with the unique address;

receive an acknowledgement signal from a destination including an address of the destination; and create the virtual communication connection based on the address of the destination.

19. A non-transitory computer-readable medium having stored thereon computer-executable instructions that when executed by a computer cause the computer to:

receive a request for data communications from a source device or a destination device via a virtual communication channel and via an interface coupled between a processor of the computer and a power supply of the computer, the virtual communication channel created by modulating the power supply of the computer to encode a series of static pulses onto the AC power waveform to communicate a unique address associated with the source device or the destination device;

acknowledge the request;

receive data encoded at predetermined intervals according to a function of frequency unique to the virtual communication channel; and decode the data packet based on the function.

20. The computer readable medium of claim 19, wherein each static pulse has a magnitude of approximately 0.00125 volts.

21. The computer readable medium of claim 19, wherein the function is the inverse of:

$$f(x) = \frac{x + \cos(x)}{2^x}.$$

22. The computer readable medium of claim 19, wherein the data packet includes an address of a destination, the address including at least one of an identification number associated with the power supply of a source, an identification number associated with a basic input-output system (BIOS) of the source, a clock time of a first ping sent from the source to the destination, a clock time value from a real-time clock of the source, a speed of a source processor, a random function and an input-output error time.

23. The computer readable medium of claim 19, wherein each of the static pulses represents a change of a logical state corresponding to an individual data bit in the data packet.

24. The computer readable medium of claim 19, further comprising computer-executable instructions that when executed by the computer cause the computer to:

receive, by the processor via the interface coupled between the processor and the power supply, a series of static pulses corresponding to an encoding of a sequence of pings, a series of static pulses on the AC power waveform, the series of static pulses corresponding to an encoding of the sequence of pings and a unique address; and establish the virtual communication channel based on the unique address.

* * * * *